Aug. 31, 1954     W. A. CLARK     2,687,767
SPRING CUSHION STRUCTURE
Filed Feb. 23, 1951                                                  6 Sheets-Sheet 1

INVENTOR.
William A. Clark
BY
Otto A. Earl
Attorney.

Aug. 31, 1954  W. A. CLARK  2,687,767
SPRING CUSHION STRUCTURE
Filed Feb. 23, 1951  6 Sheets-Sheet 2

INVENTOR.
William A. Clark
BY
Attorney

Aug. 31, 1954  W. A. CLARK  2,687,767
SPRING CUSHION STRUCTURE
Filed Feb. 23, 1951  6 Sheets-Sheet 3
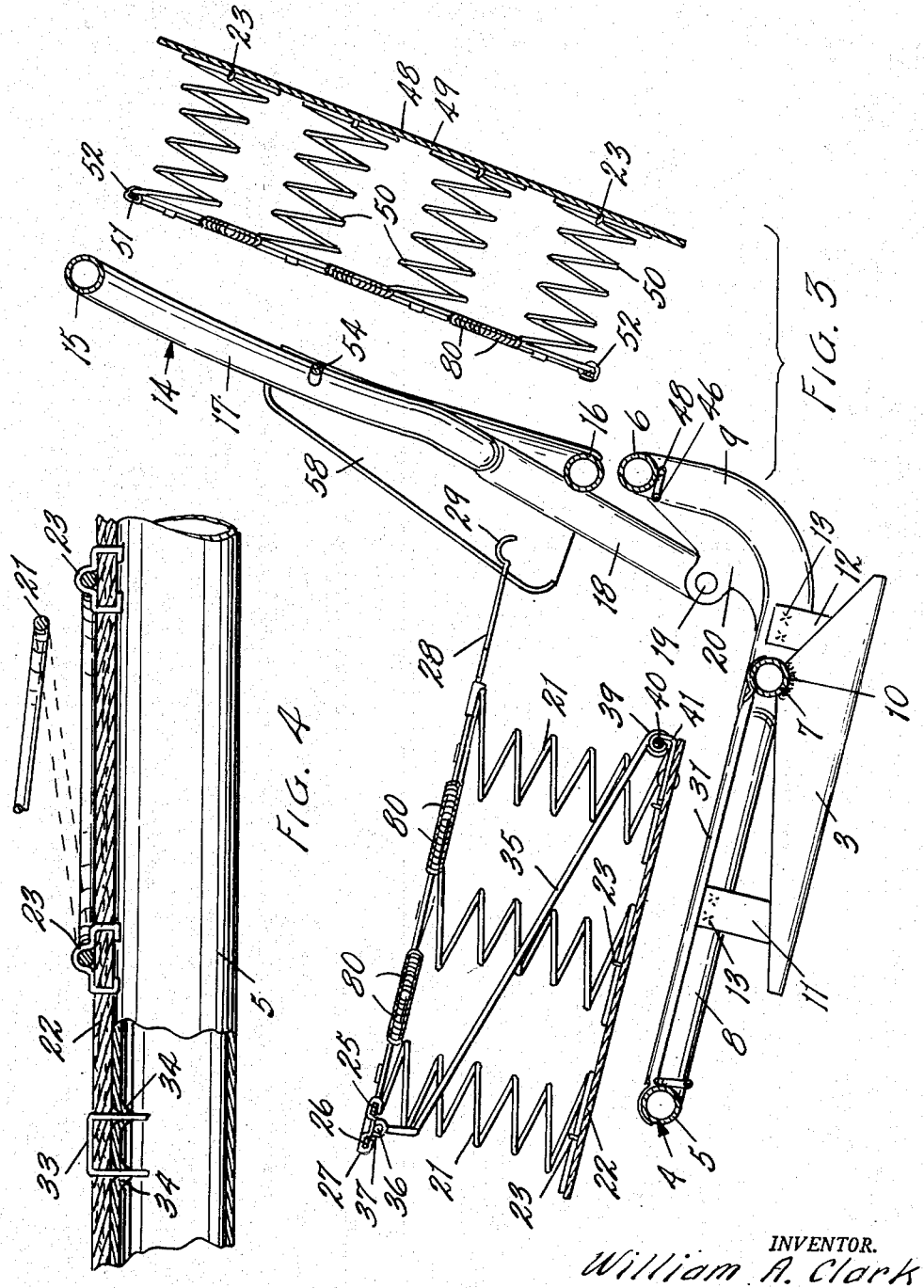
INVENTOR.
William A. Clark
BY
Otis A. Earl
Attorney.

Aug. 31, 1954
W. A. CLARK
2,687,767
SPRING CUSHION STRUCTURE
Filed Feb. 23, 1951
6 Sheets-Sheet 4
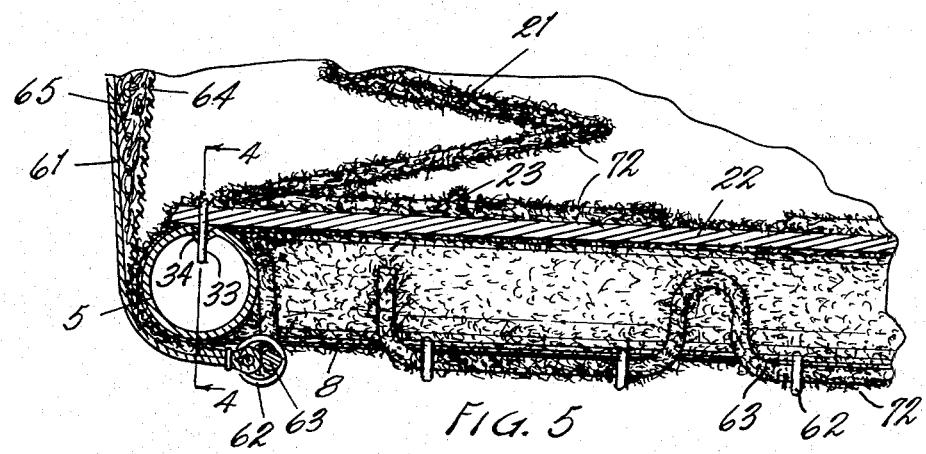
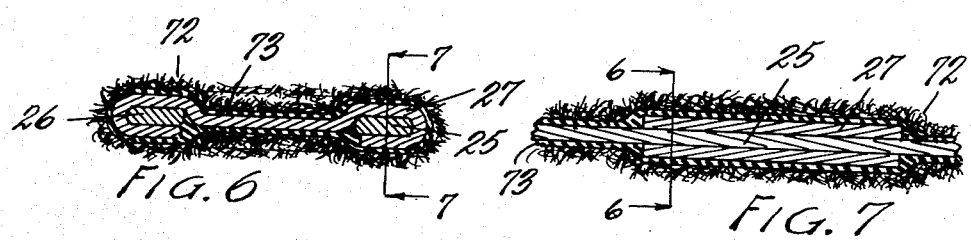
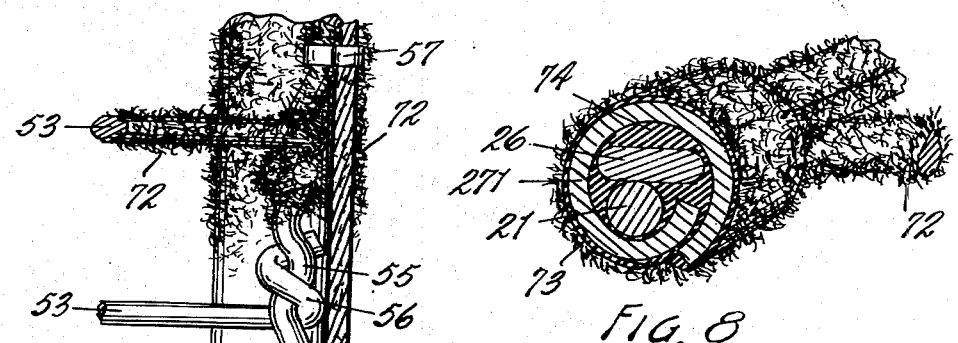
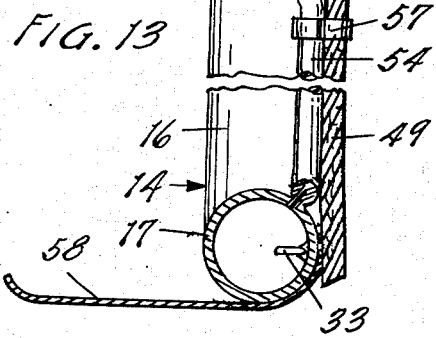
INVENTOR.
William A. Clark
BY
*[signature]*
Attorney Aug. 31, 1954 W. A. CLARK 2,687,767
SPRING CUSHION STRUCTURE
Filed Feb. 23, 1951 6 Sheets-Sheet 5
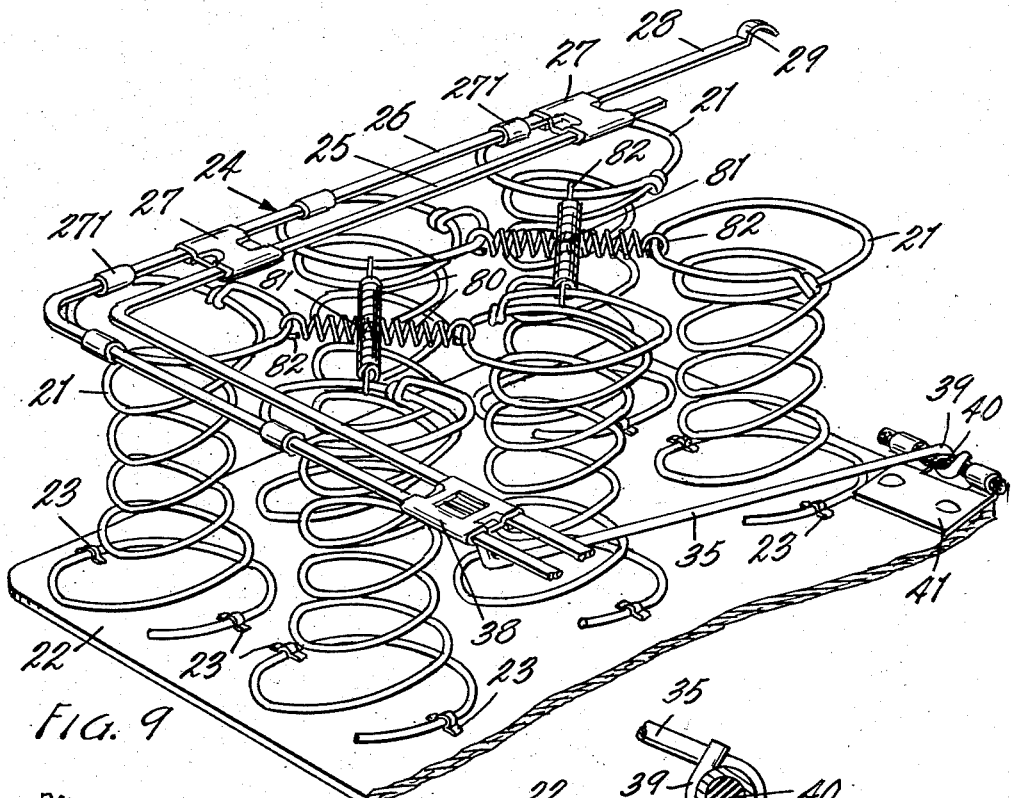
FIG. 9
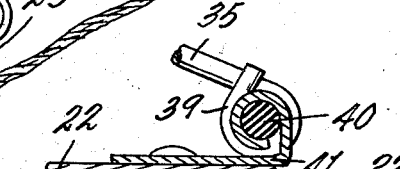
FIG. 11
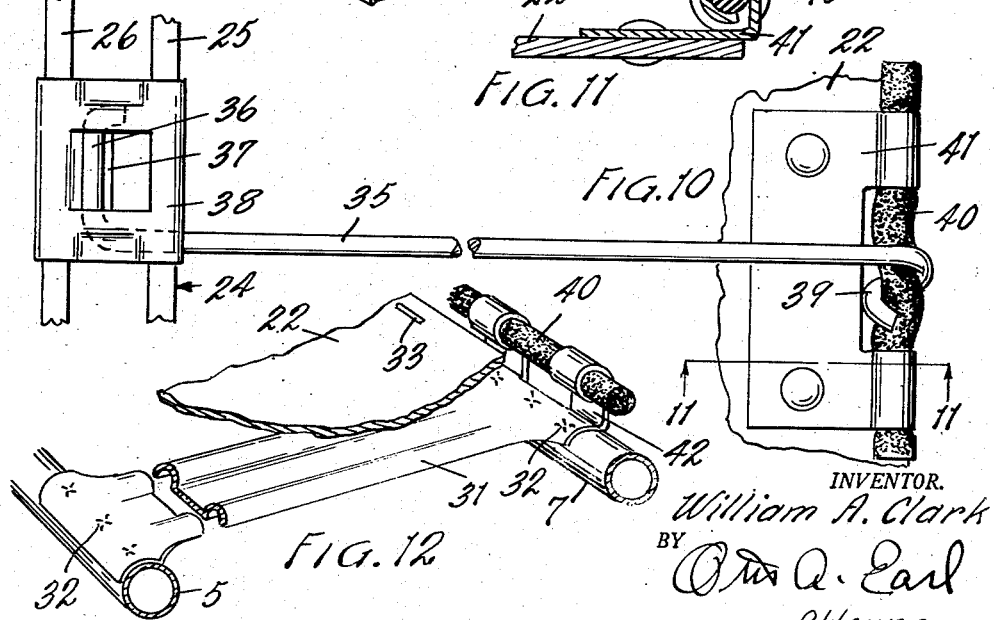
FIG. 10
FIG. 12
INVENTOR.
William A. Clark
BY
Otis Q. Earl
Attorney.

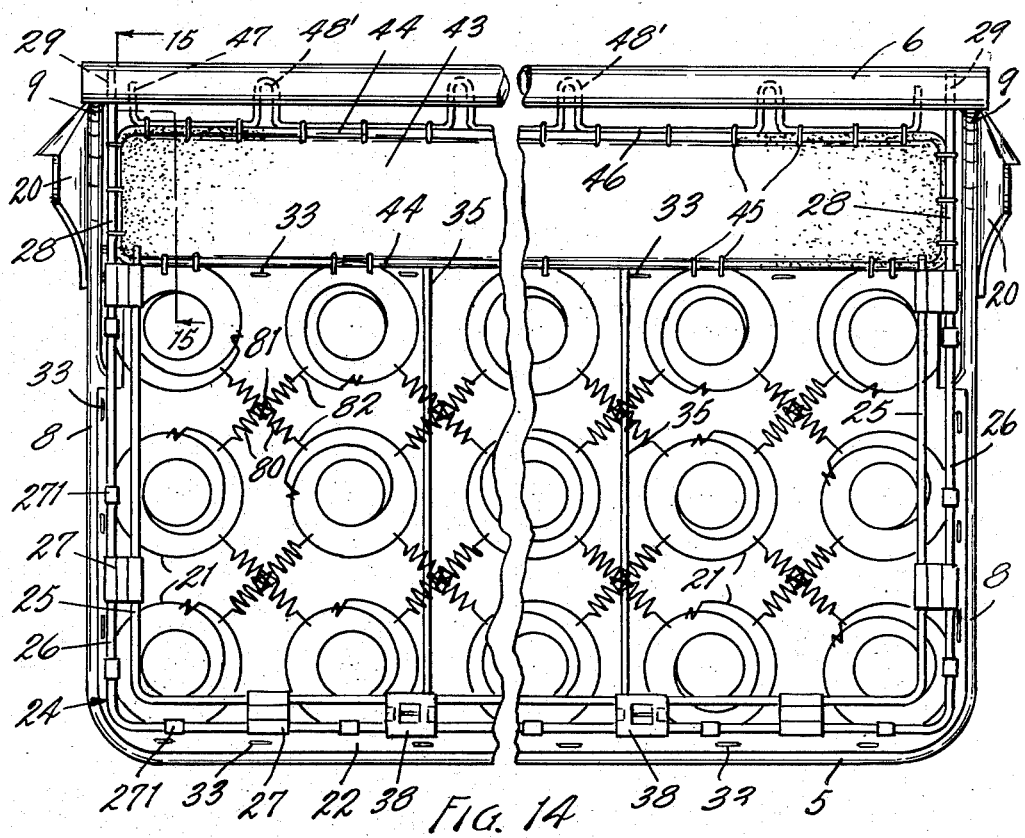
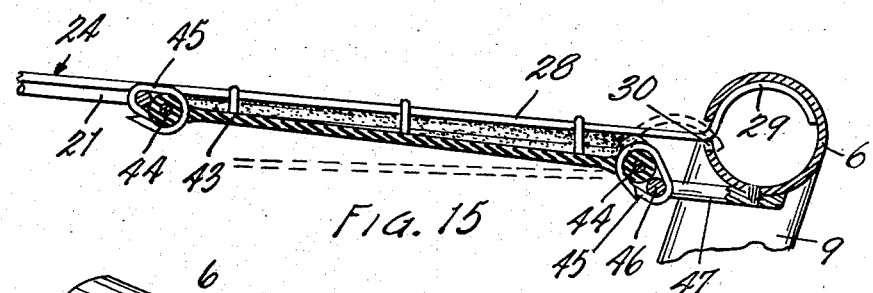
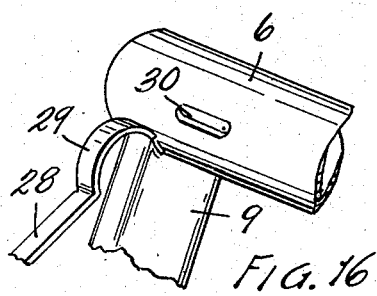

Patented Aug. 31, 1954

2,687,767

UNITED STATES PATENT OFFICE 2,687,767

SPRING CUSHION STRUCTURE

William A. Clark, Detroit, Mich.

Application February 23, 1951, Serial No. 212,412

11 Claims. (Cl. 155—179)

This invention relates to improvements in spring cushion structures and method of manufacturing the same.

In this application, I illustrate and describe my invention as embodied in automobile seat cushion and back structures and with conventional helically coiled springs, but I desire to emphasize that my invention may be embodied in furniture or upholstery spring structures and other spring structures of various types and with other forms of springs for various uses. Therefore, the terms "cushions" and "spring structures" as employed herein are used in their generic sense.

The main objects of this invention are:

First, to provide a spring structure in which the several parts are very effectively supported in their relation to each other and may be assembled with a minimum of labor.

Second, to provide a spring structure which is relatively light in weight and at the same time very strong and rigid and in which the springs are effectively supported.

Third, to provide a spring structure which may be economically and efficiently upholstered and one in which certain materials heretofore commonly employed in similar structures may be omitted with the result that there is a large saving of both material and labor.

Fourth, to provide a seat back structure which may be upholstered without the necessity of padding the rear side of the structure.

Fifth, to provide a spring structure which is substantially noiseless in use and one in which pads or noise eliminating buffers are eliminated.

Sixth, to provide a spring structure in which the necessity for lubricating joints or connections for parts is eliminated.

Seventh, to provide a spring structure in which the parts are protected from corrosion without the necessity of japanning or other rust-proofing treatment and the structure is very attractive in appearance.

Eighth, to provide a spring structure having these several advantages which may be economically produced.

Ninth, to provide a method of producing structures having these advantages.

Objects relating to details and economies of the invention will appear from the description to follow. The invention is defined and pointed out in the claims.

A preferred embodiment of the invention is illustrated in the accompanying drawing, in which:

Fig. 3 is an exploded end elevational view with seat and back frame parts in vertical section on a line corresponding to that of line 2—2 of Fig. 1, prior to the application of the coating thereto, spring units being shown prior to assembly with the frame parts.

Fig. 4 is an enlarged fragmentary view partially in section on a line corresponding to line 4—4 of Fig. 5 prior to the application of the coating material which is shown in Fig. 5.

Fig. 5 is an enlarged fragmentary view in section on a line corresponding to line 5—5 of Fig. 1, with the upholstery in position.

Fig. 6 is an enlarged fragmentary view of the top border frame structure in section on a line corresponding to line 6—6 of Fig. 7.

Fig. 7 is a fragmentary view in section on line 7—7 of Fig. 6.

Fig. 8 is an enlarged prespective view in section on a line corresponding to line 8—8 of Fig. 1.

Fig. 9 is a fragmentary perspective view of the seat spring unit prior to the coating thereof.

Fig. 10 is an enlarged fragmentary plan view of the portions of the structure shown in Fig. 9 illustrating details of one of the brace members.

Fig. 11 is a fragmentary view in section on a line corresponding to line 11—11 of Fig. 10.

Fig. 12 is a fragmentary perspective view illustrating structural details and certain of the assembling steps and a modification of clips.

Fig. 13 is an enlarged fragmentary view partially in section on a line corresponding to line 13—13 of Fig. 1 with parts partially coated.

Fig. 14 is a fragmentary plan view of the seat assembly of the embodiment illustrated piror to applying the coating material thereto.

Fig. 15 is an enlarged fragmentary view on a line corresponding to broken line 15—15 of Fig. 14.

Fig. 16 is a fragmentary perspective view illustrating structural details and one of the steps in assembling the seat cushion spring unit with the seat frame.

Figure 1:
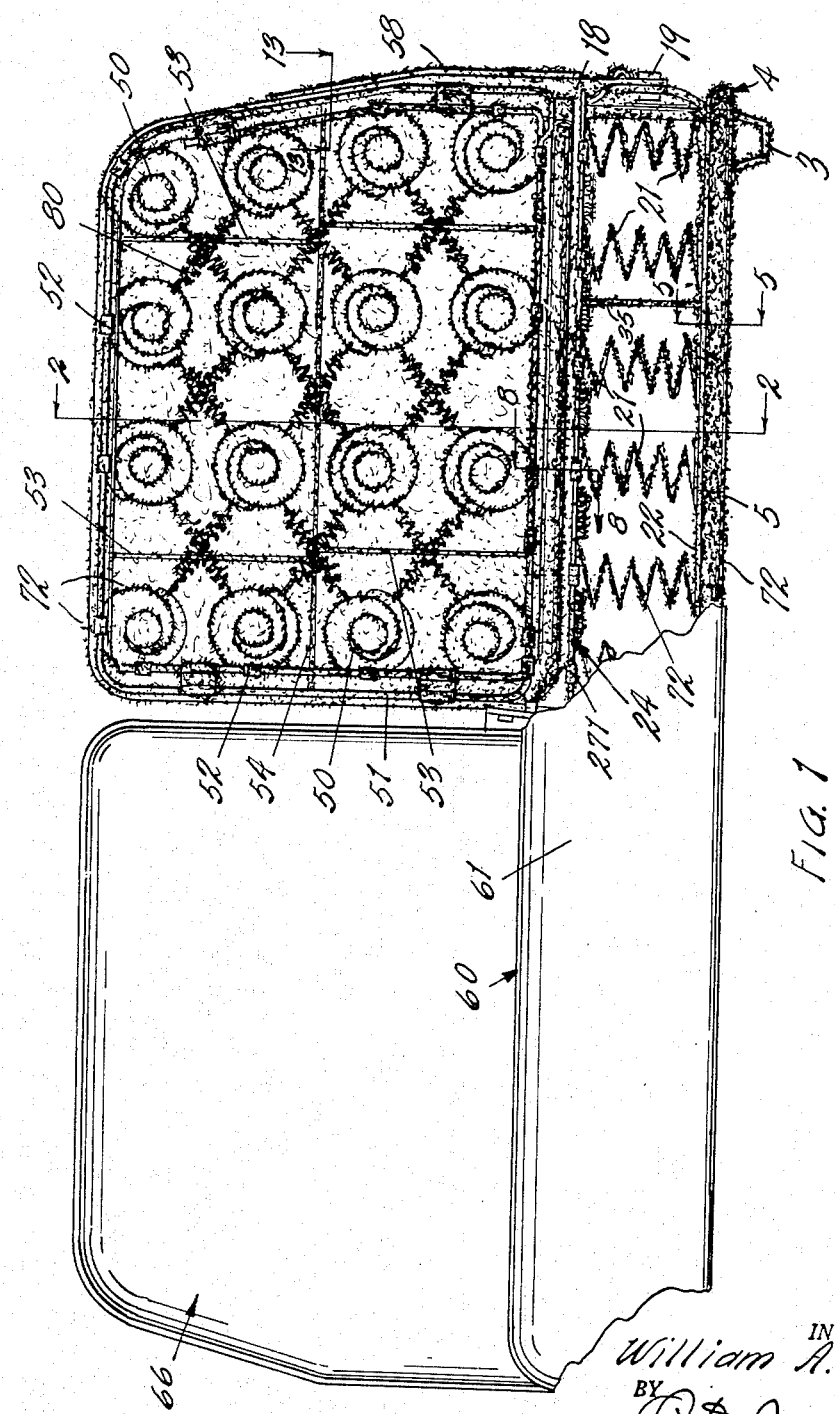
Fig. 1 is a fragmentary front elevational view of an automobile seat assembly embodying my invention, the upholstery being omitted from a portion of the assembly.

In the embodiment of my invention illustrated in the accompanying drawing, I represents a seat mounting or support embodied in or attached to the automobile floor structure, conventionally indicated by the line 2. The seat base members 3 are designed to be suitably mounted on the support 1 and carry the seat frame designated generally by the numeral 4. This seat frame is in the embodiment illustrated formed of tubing and comprises the front member 5, rear member 6 and intermediate member 7 connected by the end members 8. The rear ends of the end members are curved upwardly to provide upwardly projecting arms 9.

The intermediate seat frame member 7 is fixedly secured to the base members 3 as by welds indicated at 10. Struts 11 and 12 extend from the base members 3 to the end members of the seat frame and are fixedly secured thereto as by spot welding indicated at 13. The lower ends of the struts are fixedly secured to the base members, this securing means, however, not being illustrated.

The seat back frame designated generally by the numeral 14 comprises top and bottom horizontal members 15 and 16 connecting end pieces or uprights 17. The end pieces or uprights 17 are extended downwardly into arms 18 which are pivoted at 19 to brackets 20 fixedly secured in the angles of the upturned arms 9 of the base frame.

The structure illustrated is a front automobile seat structure and there are two back members designed to collapse forwardly as is usual in two-door sedans and coupes.

Among other features of my invention, I provide a structure in which the body springs 21 and their supporting and connecting members are assembled as a unit for mounting on the seat frame 4. This assembly comprises a base 22 in the form of a panel. The proportions of the panel correspond to those of the front and intermediate seat frame members 5 and 7 and the end members 8. The panel may desirably be of fabricated material such, for example, as "masonite" or the like. The springs 21 are secured to the panel by staples or clips 23 which engage the bottom coils resting upon the panel.

The top border frame designated generally by the numeral 24 is mounted upon the top coils of the border springs as is best shown in Fig. 9. This border frame comprises the outer and inner border members 25 and 26 disposed in spaced relation and connected by clips 27 which are formed of sheet metal, the ends of the clips being clamped around the members 26 and 25 which are desirably formed of wire of flat section disposed horizontally flatwise.

This border frame, with some modifications, is that shown in the Asaro Patent 2,336,975 issued December 14, 1943. This border frame overlaps the top coil of the border springs and is secured thereto by means of metal clips 271 which embrace the outer border member of top coils overlapped thereby.

The outer top border members 26 are extended rearwardly of the rear body springs 21 of the unit to provide arms 28 which terminate in downwardly facing curved hooks 29 which are engageable with the slots 30 in the rear seat frame member 6 with a slight tilting movement of the unit. This results in a retaining engagement. The spring unit is then positioned with its bottom panel on the frame members 5, 7 and 8 and over the sheet metal cross brace or tie member 31 which extends between the members 5 and 7 and is welded thereto as indicated at 32, Fig. 12.

The top coils of adjacent springs in both the seat and back are connected by cross helical ties 80 mainly shown conventionally. These helical ties 80 are interlocked at their crossing point 81 and are provided with hooks 82 at their ends, which engage the top coils of body springs. They coact with the body springs in forming a support for the upholstery and yieldably distribute the load carried by adjacent springs.

The spring supporting panel 22 is secured to the frame members 5, 7 and 8 by means of the staple-like fasteners 33 which are driven through the bottom panel and into the frame members as is clearly shown in Fig. 4. The staples are of a character that pierce the frame members as indicated and the deflected portions 34 of the metal resulting from the driving of the prongs of the staple through the metal result in the very effective clutching engagement so that the staple fastenings are very effectively retained and the panel 22 which, as stated, may desirably be of fabricated material such, for example, as "masonite" is fixedly secured to the frame. The panel 22 thus secured to the frame constitutes a bracing member for the frame and becomes in effect a part of the seat frame which is very rigid and relatively light as compared to seat frames which have been widely used.

The top border frame is supported against swaying movement by means of the diagonally disposed braces 35 which terminate at their upper ends in laterally turned arms 36 which are engaged by retaining tongues 37 on the clips 38. These clips 38 are the same as the clips 27 except that they are provided with the brace attaching tongues 37.

The lower ends of these braces are provided with spiral hooks 39 which are engaged with the flexible strips 40 secured to the panel 22 by means of the clips 41 (see Figs. 9, 10 and 11.) One of the strips 40 is supported by the upturned arms 42 on the rear end of the cross piece 31 (see Fig. 12). The upper coils of the rear row of springs are connected to the rear base member 6 by means of the elastic filler strip 43 which is desirably formed of rubber and provided with reinforced beaded edges 44. The front edge of the strip 43 is secured to the rear springs of the assembly by means of clips or "hog rings" 45 while the ends are secured to the rearwardly projecting arms of the top border frame and the rear edge is secured to a rod 46 formed of wire and having arms 47 at its end and intermediate arms 48' which are welded to the under side of the base frame member 6 as is best shown in Figs. 3, 14 and 15.

The back spring unit designated by the numeral 48 comprises the bottom panel 49, desirably of fabricated material such, for example, as "masonite," and the body springs 50 are secured to the panel by means of the staple-like fastenings 23. The top coils of the border springs are connected to the top border rim 51 by means of the clips 52. The panel 49 is secured to the rear sides of the back frame top and bottom members 15 and 16 and end members 17 by means of staple-like fastenings 33 driven through the back panel and the frame members as is clearly illustrated in connection with securing the seat panel 22 to the seat frame.

The top border frame of the back spring assembly is provided with upwardly diverging braces 53 which are secured to the upper and lower border frame members by means of suitable clips, not detailed, and to the supporting rods 54 which are offset and corrugated or kinked at 55 to receive the spirally hooked ends 56 of the braces. The rod 54 is secured to the back panel by means of the fasteners 57, being welded at its ends to the upright or end portions 14 of the back frame. The arms 18 of the back frame, as stated, are pivotally mounted at 19 on the brackets 20 on the seat frame.

In the embodiment illustrated the back frame is provided with upholstery supporting wings or plates 58 which are welded to the outer sides of the end members or side members of the back frame and their lower ends extend rearwardly of the bottom back frame members 16. The base members 3 are provided with slides 59 adjustable upon the support 1. The details of the adjusting means are not illustrated as they form no part of this invention.

The seat cushion upholstery designated generally by the numeral 60 is provided with skirt portions 61 which are folded around the front bottom and frame members and secured by clips 62 to the attaching rods 63 which are secured on the inner sides of the side and end frame members and to the under side of the rear frame member 6.

The upholstery illustrated comprises a lining 64 and padding 65, the back upholstery designated generally by the numeral 66 provided with skirt portions 67 and a back portion 68 which is disposed at the outer side of the back panel 49. The back upholstery comprises a suitable facing 69, a lining 70 and padding material 71.

It has been pointed out that one of the objects of the invention is to provide a structure which is noiseless and one in which no lubricant is required for the various parts which may have some movement relative to each other and no rubber pads or buffers are required. In portions of the drawings this coating material is omitted for convenience in illustrating structure.

Figure 2:
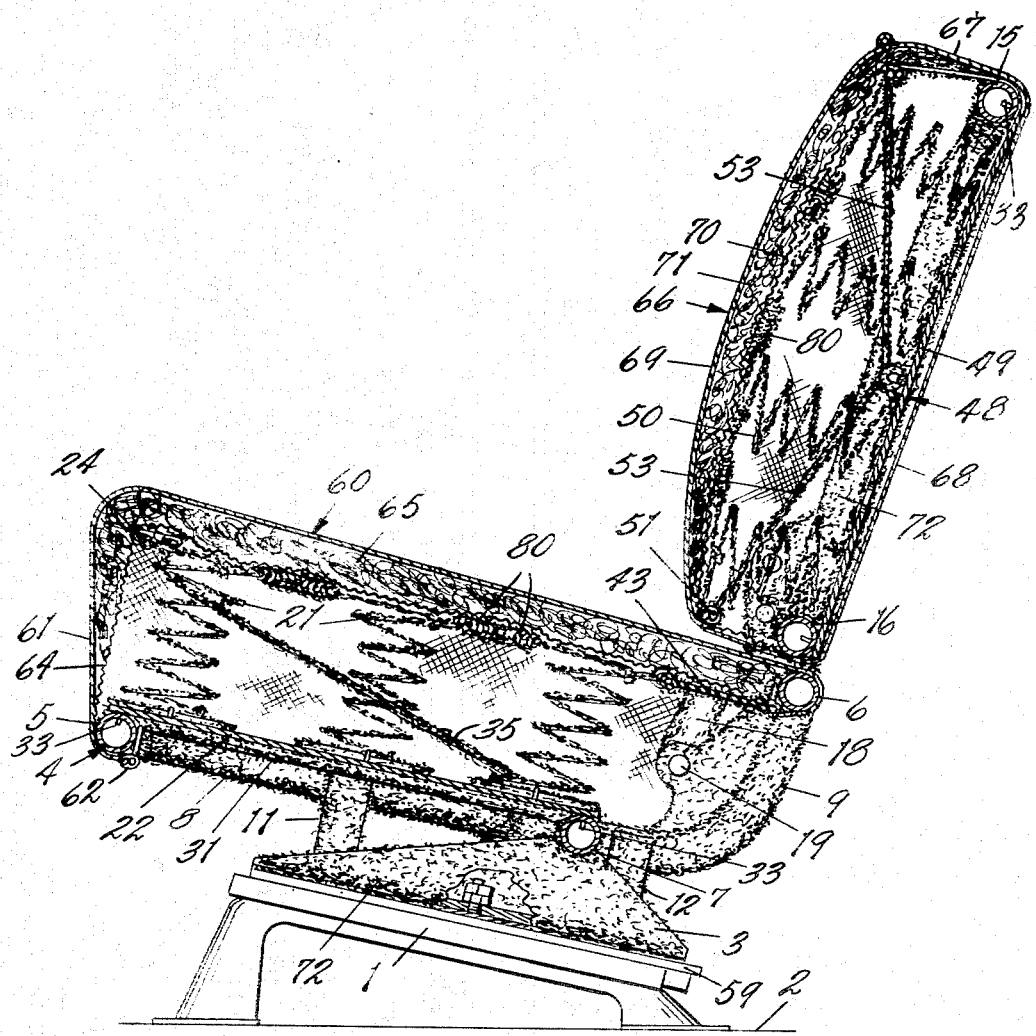
Fig. 2 is a fragmentary view partially in end elevation and partially in vertical section on a line corresponding to line 2—2 of Fig. 1.

In Figs. 1 and 2 the parts are shown as completely covered with a coating of flock or fine fibrous filaments designated by the numeral 72. This flock is adhered to the parts by means of a coating 73 of suitable adhesive; a latex or latex composition has been found to be satisfactory. The flock is applied while the adhesive coating is in its plastic or unset condition. It is desired to point out that while other adhesives than adhesives characterized by containing latex may be used, it is desirable that the adhesive maintain a substantial degree of elasticity after the flock has been applied thereto and is adhesively secured to the parts and the adhesive has become set.

The presently preferred commercial practice is to completely assemble the seat unit, that is, the unit comprising the spring assembly, its supporting frame and the base, dip it in the liquid adhesive and apply the flock prior to the setting of the adhesive so that there is a complete coating of all the parts and their joints or connecting means. Where there are spaces between the connected parts such as in Fig. 8 where the coils of the body spring 21 are connected to the top rim member 26 by means of the clips 28, the adhesive fills the openings between these parts as shown at 74 in Fig. 8. It will be understood that in this figure the clearance or space between the connected parts is exaggerated for purposes of illustration, but the adhesive material fills the openings or spaces and effectively prevents rattling or squeaking and avoids the necessity for lubricating any of the parts at their joints.

The various parts of the assembly, being coated with the flock, are provided with cushioning means so that from a practical standpoint all noise is eliminated and it is not necessary to provide pads or bumpers at various points where parts rub together or are likely to strike or contact as is now common practice in spring structures generally.

A further result accomplished by this coating having a flock covered surface is that it is unnecessary to supply padding or covering material to prevent wear of the upholstery for instance, where it is drawn around the frame members as in Fig. 5 and secured by the clips 63. The clips 63 being applied after the coating has been applied, are effectively silenced. The coating also avoids the necessity for rustproofing or japanning the assembly. The flock surface coating covers the panel of the back and permits the upholstery covering to be placed directly thereover without the necessity for padding on the inner side of the back cover 68 as is common practice in upholstering back structures where the rear side is exposed as is the case with the front seats of automobiles.

The cross helical tie members 80 are inter-engaged at their crossing points. The coating prevents any noise as a result of these helical ties being flexed in use.

Applicant's seat and back structures are very rigid, although they are of very substantially less weight than are frames of equal strength or rigidity now commonly formed of sheet metal. The applicant has substantially eliminated the use of sheet steel commonly used in the forming of frames and various other parts. Further, it has been considered necessary to use burlap in various structural relations to protect parts from wear and to eliminate noise. Substantially no burlap is required in the applicant's structure. The lining for the upholstery may be formed of light fabric stock inasmuch as the parts with which it contacts are provided with the effective wear preventive surfaces.

I have illustrated and described my invention in a highly practical embodiment thereof. I have not attempted to illustrate or describe various other adaptations or embodiments as it is believed that this disclosure will enable those skilled in the art to embody or adapt my invention as may be desired.

Having thus described my invention what I claim as new and desire to secure by Letters Patent is:

1. A spring structure comprising in combination, a frame including fixedly connected tubular front, rear, intermediate and end members, the rear ends of the end members being upturned supporting the rear member in an elevated position relative to the front and intermediate frame members, a spring unit comprising a bottom panel, helically coiled body springs disposed on and secured to said panel by staples engaging the bottom coils of the body springs, a top border frame secured to the top coils of the border springs and terminating in hooks, said rear frame member having slots with which said hooks are retainingly engaged, crossed interengaged helical tie members connecting adjacent body springs, said bottom panel being disposed upon said front, intermediate and end frame members, fasteners driven through said bottom panel and into the frame members upon which it is disposed fixedly securing the panel to said frame members with the prongs of the fasteners within the tubular frame members, and an elastic strip disposed between the rear body springs and the rear frame member, the front edge of the strip being connected to the rear row of body springs, the end edges thereof being connected to the said top border frame and the rear edge to the said rear frame member.

2. A spring structure comprising in combination a frame including fixedly connected tubular front, rear, intermediate and end members, the rear ends of the end members being upturned supporting the rear member in an elevated position relative to the front and intermediate frame members, a spring unit comprising a bottom panel, helically coiled body springs disposed on and secured to said panel by staples engaging the bottom coils of the body springs, a top border frame secured to the top coils of the border springs and terminating in hooks, said rear frame member having slots with which said hooks are retainingly engaged, crossed interengaged helical tie members connecting adjacent body springs, said bottom panel being disposed upon said front, intermediate and end frame members, and fasteners driven through said bottom panel and into the frame members upon which it is disposed fixedly securing the panel to said frame members with the prongs of the fasteners within the tubular frame members.

3. A spring structure comprising in combination a frame including fixedly connected tubular front, rear, intermediate and end members, the rear ends of the end members being upturned supporting the rear member in an elevated position relative to the front and intermediate frame members, a spring unit comprising a bottom panel, helically coiled body springs disposed on and secured to said panel by staples engaging the bottom coils of the body springs, a top border frame secured to the top coils of the border springs and terminating in hooks, said rear frame member having slots with which said hooks are retainingly engaged, crossed interengaged helical tie members connecting adjacent body springs, said bottom panel being disposed upon said front, intermediate and end frame members, fasteners driven through said bottom panel and into the frame members upon which it is disposed fixedly securing the panel to said frame members, braces connected at their upper ends to the said top border frame and provided with coils at their lower ends, and resilient supports mounted on said bottom panel and with which said coils are engaged.

4. A spring structure comprising in combination a frame including front, rear end and intermediate members, a spring unit comprising a base panel, helically coiled body springs disposed on and secured to said base panel, a top border frame including front and end portions secured upon the border body springs, the rear ends of the top border frame being connected to the said rear frame member, tie members for adjacent body springs, said base panel being disposed upon said front, intermediate and end frame members, fasteners driven through said bottom panel and into the frame members upon which it is disposed fixedly securing the panel to said frame members, the base panel constituting a reinforcing and bracing element for the said frame, and an elastic filler strip disposed between the rear body spring and the rear frame members, the front edge of the strip being connected to the top coils of the rear row of body springs, the end edges thereof being connected to the said top border frame and the rear edge to the said rear frame member.

5. A spring structure comprising in combination a frame including front, rear and intermediate members, a spring unit comprising a base panel, helically coiled body springs disposed on and secured to said base panel, a top border frame including front and end portions secured upon the border body springs, the rear ends of the top border frame being connected to the said rear frame member, tie members for adjacent body springs, said base panel being disposed upon said front, intermediate and end frame members, and fasteners driven through said bottom panel and into the frame members upon which it is disposed fixedly securing the panel to said frame members, the base panel constituting a reinforcing and bracing element for the said frame.

6. A spring structure comprising in combination a frame including front, rear end and intermediate members, a spring unit comprising a base panel disposed on said base frame with the rear edge spaced from said rear base frame member, said base frame member disposed in elevated position relative to the other base frame members, helically coiled body springs disposed on and secured to said base panel, a top border frame including front and end portions secured upon the border body springs, the rear ends of the top border frame being connected to the said rear frame member, tie members for adjacent body springs, said base panel being disposed upon said front, intermediate and end frame members, fasteners driven through said bottom panel and into the frame members upon which it is disposed fixedly securing the panel to said frame members, the base panel constituting a reinforcing and bracing element for the said frame, braces connected at their upper ends to the said top border frame, said braces being provided with loops at their lower ends, and resilient cord-like supports mounted on said bottom panel and with which said loops are engaged.

7. A spring structure comprising in combination a frame including fixedly connected tubular front, rear, intermediate and end members, the rear ends of the end members being upturned supporting the rear member in an elevated position relative to the front and intermediate frame members, a spring unit comprising a bottom panel, body springs disposed on and secured to said bottom panel, a top border frame secured to the top coils of the border springs and to said rear frame member, said bottom panel being disposed upon said front, intermediate and end frame members, and fasteners driven through said bottom panel and into the frame members upon which it is disposed fixedly securing the panel to said frame members with the prongs of the fasteners within the tubular frame members.

8. In a spring structure, the combination of a bottom frame including front, rear, intermediate and connecting end members therefor, the rear member being supported in an elevated position relative to the front and intermediate members, a spring unit comprising a bottom panel disposed upon said front, intermediate and end frame members and fixedly secured thereto, body springs mounted on said bottom panel, a top border frame including front and end portions, and a filler strip disposed between the rear body springs and rear frame member, the front edge of the strip being connected to the rear body springs, the end edges thereof being connected to said top border frame and the rear edge to said rear frame member.

9. A spring structure comprising in combination, a base frame comprising connected members of tubular section, a base panel of fibrous material disposed upon said base frame members, fasteners driven through said panel and into said frame members upon which it is disposed with the tips of fastener prongs within the tubular frame members fixedly securing the panel to the frame, the panel constituting a reinforcing and bracing element for the frame members, helically coiled body springs disposed with their bottom coils resting on and secured to said panel by staples engaging the bottom coils of the springs and driven through the bottom panel and clinched on the underside thereof, and an upholstery attaching wire secured to the inner sides of certain of the frame members with portions thereof spaced from the frame to receive upholstery attaching clips.

10. A spring structure comprising in combination, a base frame comprising connected members of tubular section, a base panel of fibrous material disposed upon said base frame members, fasteners driven through said panel and into said frame members upon which it is disposed with the tips of fastener prongs within the tubular frame members fixedly securing the panel to the frame, the panel constituting a reinforcing and bracing element for the base frame, and helically coiled body springs disposed with their bottom coils resting on and secured to said panel by staples engaging the bottom coils of the springs and driven through the bottom panel and clinched on the underside thereof.

11. In a spring structure, the combination of a frame comprising tubular members, a spring supporting panel of rigid nonmetallic material disposed upon and fixedly secured to said tubular frame members by fasteners penetrating the frame and retainingly engaged therewith with their tips within the tubular frame members, body springs mounted on said panel, a top border frame carried by said springs, braces connected at their upper ends to said top border frame and having spiral coils at their lower ends, and resilient cord-like supports for said braces mounted on said panel and with which said coils are engaged.

References Cited in the file of this patent

UNITED STATES PATENTS

| Number | Name | Date |
|---|---|---|
| 1,270,841 | Kelly | July 2, 1918 |
| 1,664,934 | Kronheim | Apr. 3, 1928 |
| 2,144,102 | Caughey | Jan. 17, 1939 |
| 2,180,500 | Bernstein | Nov. 21, 1939 |
| 2,247,543 | Bernstein | July 1, 1941 |
| 2,265,901 | Greig | Dec. 9, 1941 |
| 2,281,902 | Witz | May 5, 1942 |
| 2,308,772 | Neely | Jan. 19, 1943 |
| 2,526,183 | Williams et al. | Oct. 17, 1950 |
| 2,540,927 | Bostrom | Feb. 6, 1951 |
| 2,568,055 | Clark | Sept. 18, 1951 |
| 2,611,423 | Blum | Sept. 23, 1952 |

OTHER REFERENCES

Popular Science Magazine, Feb. 1951, page 128.